United States Patent
Mustread et al.

(10) Patent No.: US 6,672,122 B2
(45) Date of Patent: Jan. 6, 2004

(54) APPARATUS AND METHOD FOR CONDITIONING THE OUTER FLANGES OF A VEHICLE WHEEL

(75) Inventors: Larry Mustread, Bowling Green, KY (US); Danny Vincent, Sweeden, KY (US); Mike Marcum, Bowling Green, KY (US); John Penrod, Bowling Green, KY (US); Jerry Buland, Bowling Green, KY (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 10/155,249

(22) Filed: May 24, 2002

(65) Prior Publication Data

US 2003/0217578 A1 Nov. 27, 2003

(51) Int. Cl.⁷ .................................................. B21B 1/10
(52) U.S. Cl. .............................. 72/101; 72/86; 72/115; 72/125; 29/824.325
(58) Field of Search ................................. 72/82.86, 101, 72/102, 107, 110, 112, 115, 120, 124, 125; 29/894.323, 894.325

(56) References Cited

U.S. PATENT DOCUMENTS

| 4,291,559 A | * | 9/1981 | Martin ........................ 72/84 |
| 4,445,352 A | | 5/1984 | Pols |
| 4,848,125 A | * | 7/1989 | Itou et al. ..................... 72/105 |
| 5,537,850 A | * | 7/1996 | Inatani ........................... 72/85 |
| 5,722,138 A | * | 3/1998 | Yamanaka .................. 29/33 R |
| 6,298,702 B1 | * | 10/2001 | Korte ............................. 72/85 |

FOREIGN PATENT DOCUMENTS

| WO | 96/25257 | 8/1996 |
| WO | 99/15306 | 4/1999 |

OTHER PUBLICATIONS

Improved Technology Rim Edge Conditioner, Fontijne Grotness, 4 page brochure.

* cited by examiner

Primary Examiner—Ed Tolan
(74) Attorney, Agent, or Firm—MacMillan, Sobanski & Todd, LLC

(57) ABSTRACT

An apparatus adapted to condition the outer flanges of a vehicle wheel includes a main base assembly secured to a fixed surface, a lower tool assembly operatively supported by the main base assembly, at least one upper drive assembly operatively supported by the main base assembly, and an upper rim guide assembly. The upper drive assembly of the apparatus includes an electric servo drive unit operatively connected to drive a conditioner roll having an outer surface provided with a predetermined profile adapted to engage and condition at least one of the outer flanges of the vehicle wheel.

13 Claims, 18 Drawing Sheets

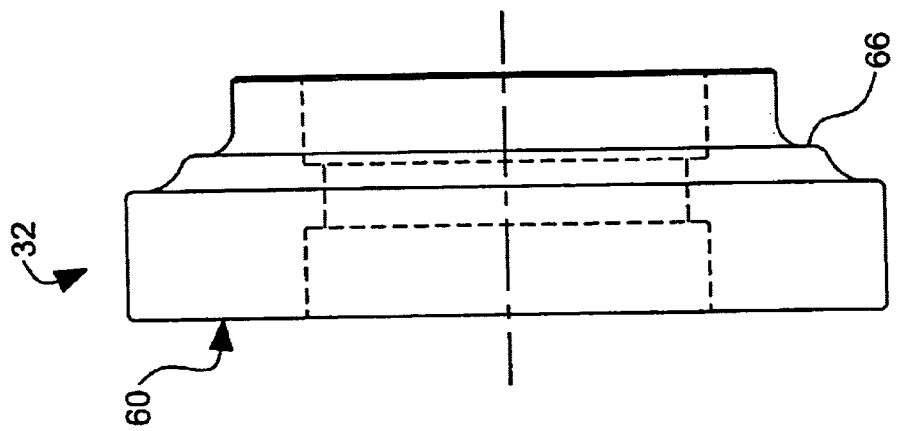
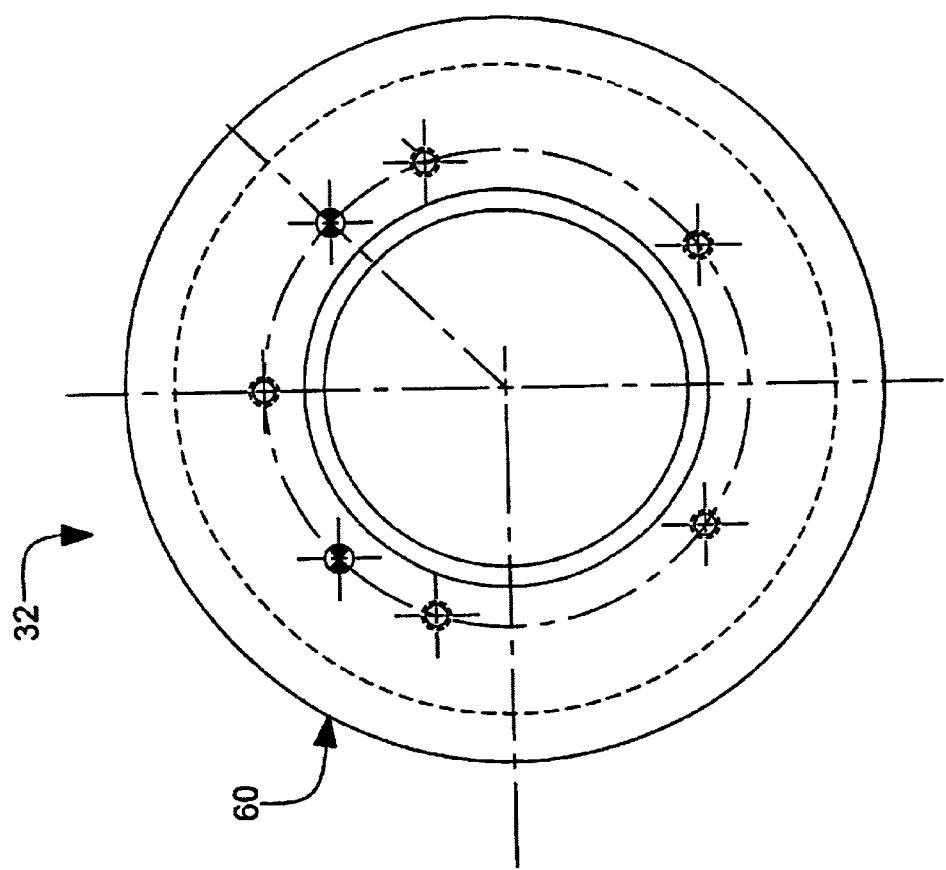

APPARATUS AND METHOD FOR CONDITIONING THE OUTER FLANGES OF A VEHICLE WHEEL

BACKGROUND OF THE INVENTION

This invention relates in general to vehicle wheels and in particular to an apparatus for conditioning an outer flange of such a vehicle wheel.

A conventional fabricated vehicle wheel is typically of a two-piece construction and includes an inner disc and an outer "full" rim. The disc can be cast, forged, or fabricated from steel, aluminum, or other alloys, and includes an inner annular wheel mounting portion and an outer annular portion. The wheel mounting portion defines an inboard mounting surface and includes a center pilot or hub hole, and a plurality of lug receiving holes formed therethrough for mounting the wheel to an axle of the vehicle. The rim is fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the disc is used. In both types of constructions, the outer annular portion of the disc is secured to the rim by welding.

A full face fabricated wheel is distinguished from other types of fabricated wheels by having a one-piece wheel disc construction. In particular, the full face wheel includes a "full face" disc and a "partial" rim. The full face disc can be formed cast, forged, or fabricated from steel, aluminum, or other alloys. The full face disc includes an inner annular wheel mounting portion and an outer annular portion which defines at least a portion of an outboard tire bead seat retaining flange of the wheel. The wheel mounting portion defines an inboard mounting surface and includes a center pilot or hub hole, and a plurality of lug receiving holes formed therethrough for mounting the wheel to an axle of the vehicle. The partial rim is fabricated from steel, aluminum, or other alloys, and includes an inboard tire bead seat retaining flange, an inboard tire bead seat, an axially extending well, and an outboard tire bead seat. In some instances, the outboard tire bead seat of the rim and the outer annular portion of the disc cooperate to form the outboard tire bead seat retaining flange of the full face wheel. In both types of constructions, the outboard tire bead seat of the rim is positioned adjacent the outer annular portion of the disc and a weld is applied to secure the rim and the disc together.

Sometimes the edge of the inboard tire bead seat retaining flange and/or the edge of the outboard tire bead seat retaining flange can have sharp edges along portions thereof. In order to remove the sharp edges, it is known to hand buff the inboard and outboard tire bead seat retaining flanges with an appropriate tool, such as a hand grinder or sander. However, the hand buffing operation is time consuming and expensive to perform. Also, there is tooling that is used to remove the sharp edges. The tooling includes small diameter tool steel rolls which are hydraulically actuated. While the tooling is faster than the hand buffing, it has not met customer requirements. Thus, it would be desirable to have an apparatus which was effective to remove any sharp edges from the inboard and outboard tire bead seat retaining flanges of the wheel rim which was reliable, fast and relatively inexpensive.

SUMMARY OF THE INVENTION

This invention relates to an apparatus and method for conditioning the outer flanges of a vehicle wheel. The apparatus includes a main base assembly secured to a fixed surface, a lower tool assembly operatively supported by the main base assembly, at least one upper drive assembly operatively supported by the main base assembly, and an upper rim guide assembly. The upper drive assembly includes an electric servo drive unit operatively connected to drive a conditioner roll having an outer surface provided with a predetermined profile adapted to engage and condition at least one of the outer flanges of the vehicle wheel. The use of the electric servo drive units of the present invention are operative to give precise control, enable varying speeds, and provide for repeatability and will operate with variance related to the incoming parts (i.e., varied widths and thicknesses).

Other advantages of this invention will become apparent to those skilled in the art from the following detailed description of the preferred embodiment, when read in light of the accompanying drawings.

BRIEF DESCRIPTION OF THE DRAWINGS

FIG. 4 is a view of the rim support roll shown in the apparatus of the present invention illustrated in FIGS. 1 and 3.

FIG. 5 is a view of the rim support roll taken along line 5—5 of FIG. 4.

DESCRIPTION OF THE PREFERRED EMBODIMENT

Figure 1:
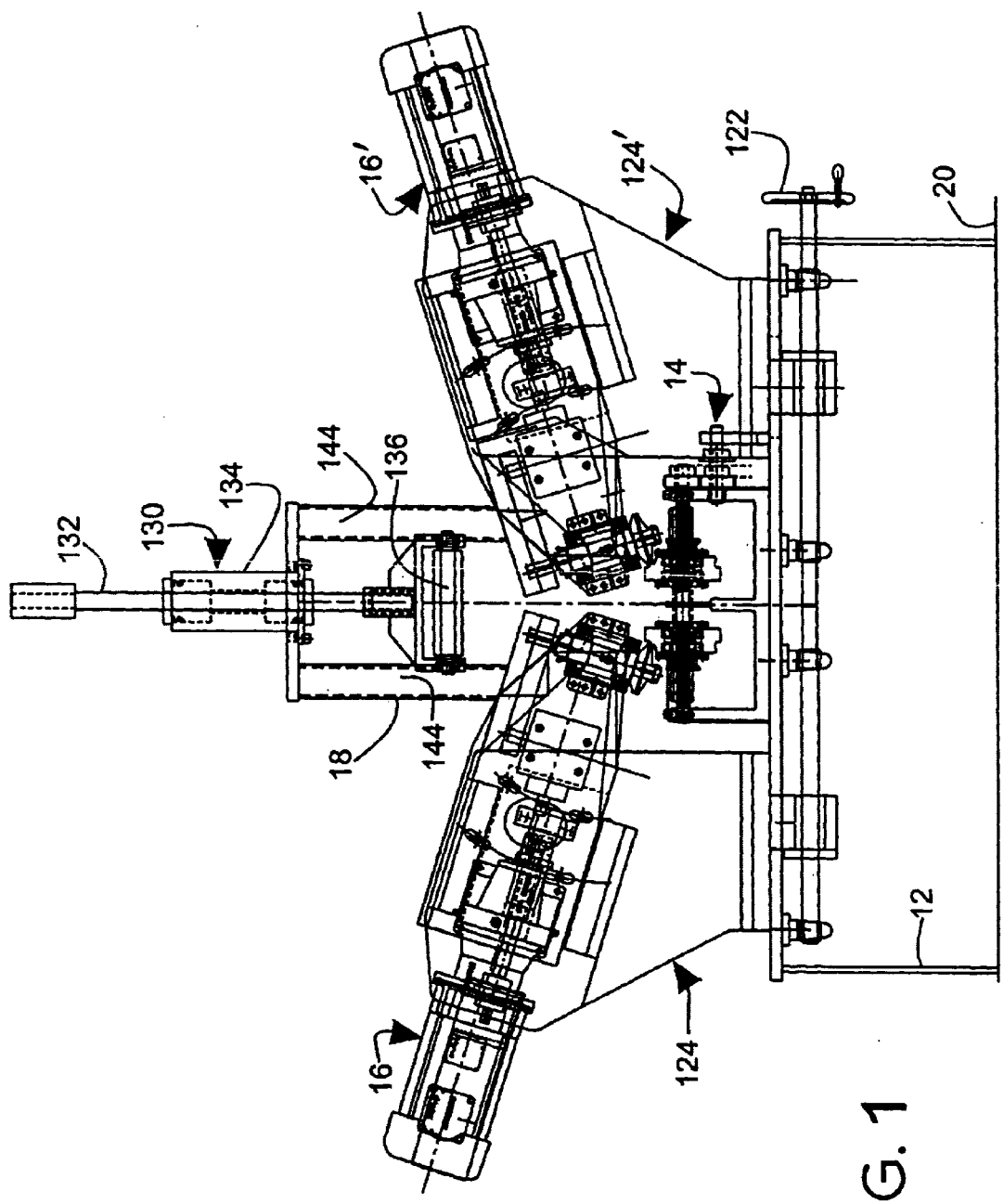
FIG. 1 is a plan view of an apparatus for producing a vehicle wheel in accordance with the present invention.

Referring now to the drawings, there is illustrated in FIG. 1 a vehicle wheel edge conditioning apparatus, indicated generally at 10, in accordance with the present invention. The apparatus 10 is adapted for use in producing a vehicle wheel, such as the vehicle wheel 200 shown in FIG. 11. As shown in this embodiment, the vehicle wheel 200 is a fabricated well attached vehicle wheel. However, as will be discussed below, while the present invention will be described and illustrated in connection with the particular vehicle wheels disclosed herein, it is understood that the invention can be used in the production of other types of fabricated and non-fabricated vehicle wheels if so desired.

Figure 2:
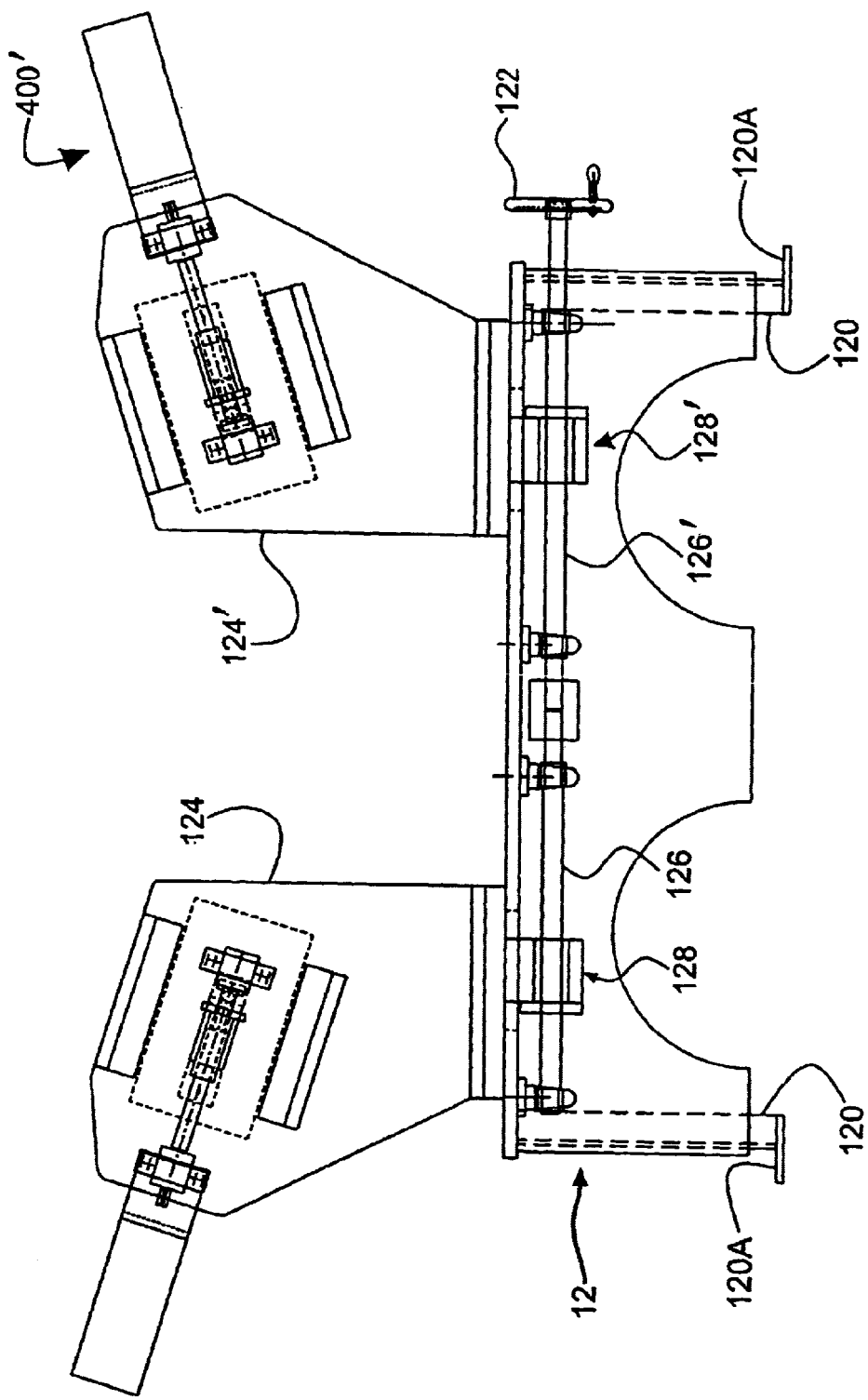
FIG. 2 is a view of the main base assembly shown in the apparatus of the present invention illustrated in FIG. 1.

As shown in FIG. 1, the apparatus 10 includes a main base assembly 12, a lower tool assembly 14, a pair of upper drive assemblies 16 and 16', and an upper rim guide assembly 18. The main base assembly 12 is secured to a fixed surface, such as a floor 20, by suitable means. As shown in FIG. 2, in the illustrated embodiment, the main base 12 is provided with a plurality of legs 120 (two of such legs 120 being shown in FIG. 2), having flanged lower ends 120A which abut the floor 20 and are adapted to receive bolts (not shown) or other suitable fasteners to secure the main base assembly 12 to the floor 20. Alternatively, other suitable fastening techniques can be used to secure the main base assembly 12 to the floor 20. The main base assembly 12 is adapted to support the lower tool assembly 14.

The main base assembly 12 includes a first or left hand motor stand 124 for supporting the upper drive assembly 16 and a second or right hand motor stand 124' for supporting the upper drive assembly 16'. The main base assembly 12 further includes a first or left hand ball screw 126 and a second or right hand ball screw 126'. The left hand ball screw 126 is operatively coupled to the left hand motor stand 124 via a ball screw adapter 128, and the right hand ball screw 126' is operatively coupled to the right hand motor stand 124' via a ball screw adapter 128'. The ball screws 126 and 126' are operatively connected to and adjusted by a hand wheel 122. Thus, the hand wheel 128 is operative to control and adjust the positions of the associated motor stands 124 and 124' relative to a center axis B of the main base assembly 12.

Figure 2A:
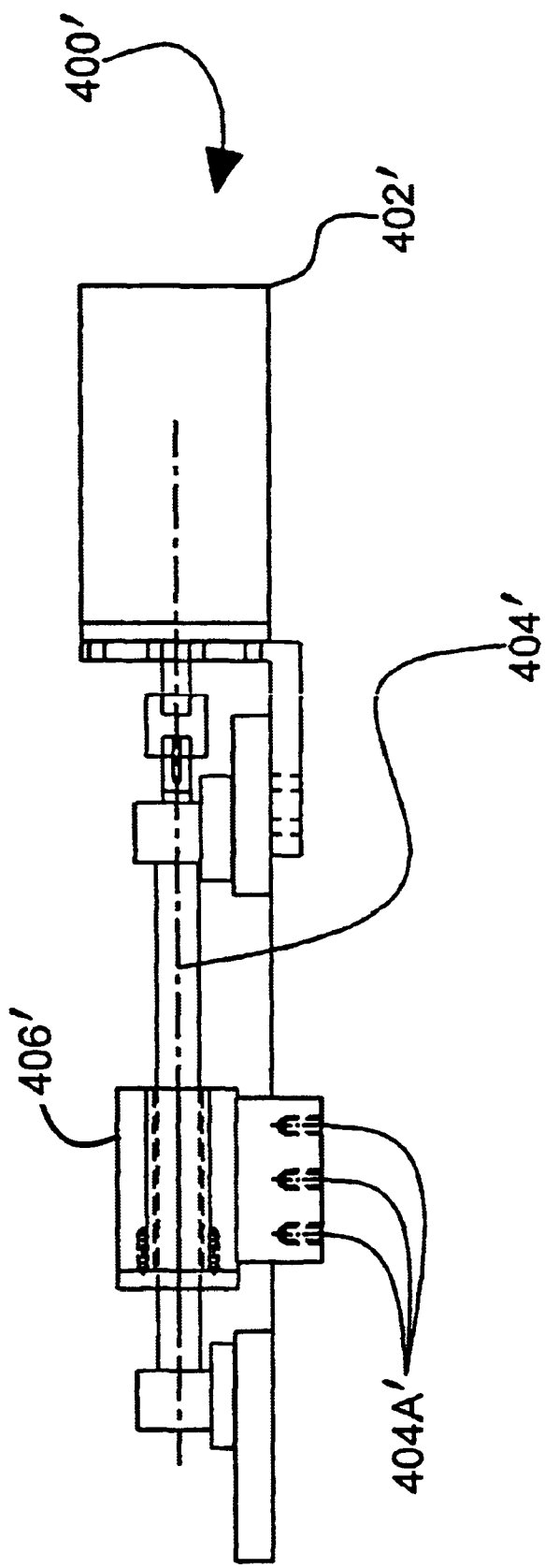
FIG. 2A is a view of a portion an upper drive assembly shown in FIG. 2.

Referring now to FIG. 2A, the components of the right hand servo motor unit, indicated generally at 400', of the upper drive assembly 16' will be discussed. The motor unit 400' is supported by the right hand motor stand 124' and includes a servo motor 402' which is operatively connected to a first end of a ball screw 404', and a ball screw adapter 406' which is operatively connected to a second end of the ball screw 404'. The adapter 406' is provided with a plurality of threaded openings 404A' formed therein. As will be discussed below, the openings 404A' are adapted to receive threaded ends of suitable fasteners which first extend through openings (not shown) provided in a plate 98' of an electric condition drive unit 78' of the upper drive assembly 16'. The structure of a left hand servo drive unit 400 is identical to that of the right hand servo drive unit 400'.

Figure 3:
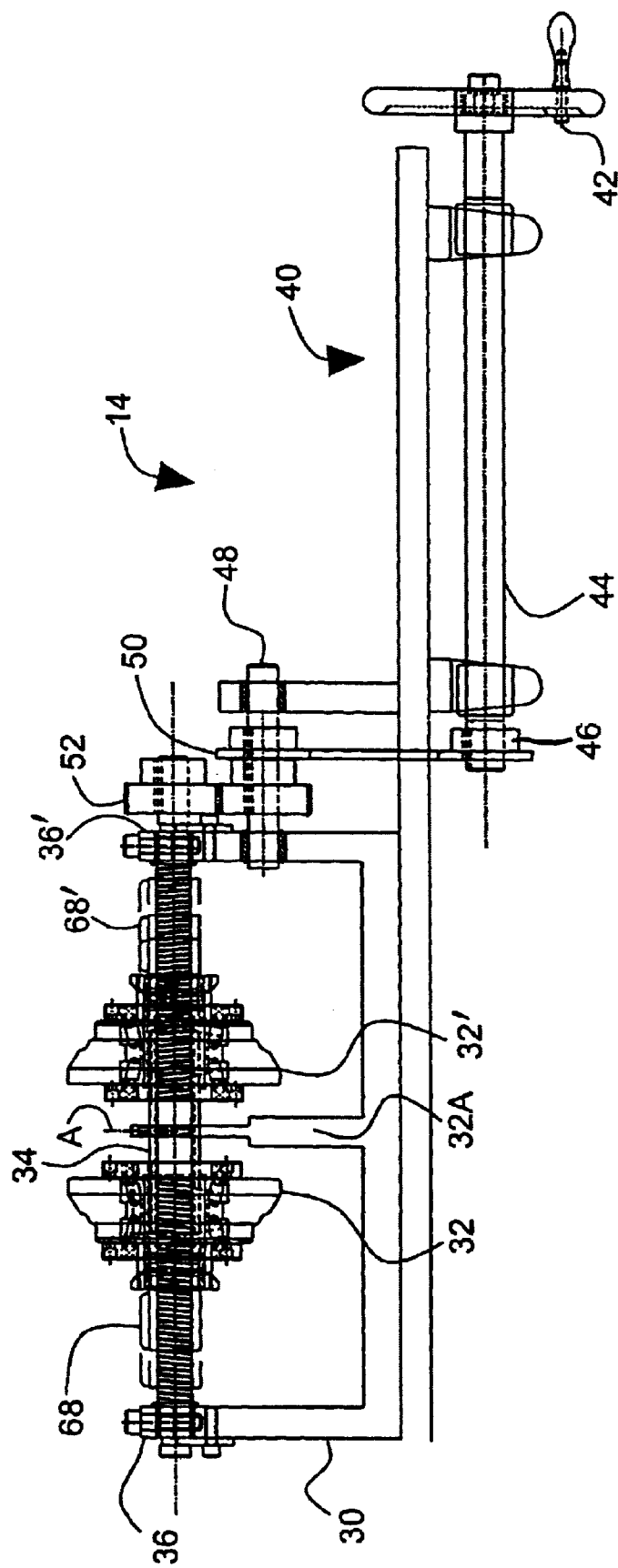
FIG. 3 is a view of the lower tooling apparatus shown in the apparatus of the present invention illustrated in FIG. 1.

As shown in FIG. 3, the lower tool assembly 14 includes a tool frame 30 which supports a pair of lower tooling members 32 and 32'. Structurally, the tooling members 32 and 32' are essentially mirror images of one another. Thus, for discussion purposes, only the tooling member 32 will be illustrated and described in detail; however, it is understood that the tooling member 32' has a construction which is the same as that of the tooling member 32.

The tooling members 32 and 32' are disposed on a center shaft 34. The shaft 34 is supported on the tool frame 30 by a pair of bushing 36 and 36' located on opposed ends of the tool frame 30. The tooling members 32 and 32' are adjustable relative to an axis A defined by a center portion 30A of the tool frame 30 by an appropriate means to accommodate different wheel widths. In the illustrated embodiment, a manually adjustable mechanism, indicated generally at 40, is provided to change the position of the tooling members 32 and 32' relative to the center portion 30A. The mechanism 40 includes a handle 42, a shaft 44, a first sprocket 46, a jack shaft 48, a second sprocket 50, and a spur gear 52. In operation, rotation of the handle 42 in a first direction causes the associated left hand ball screw 68 and right hand ball screw 68' to rotate which results in the respective tooling member 32 and 32' being moved in a first direction which is either away from or toward the center portion 30A.

The lower tooling member 32 includes a rim support roll 60 which is rotatably supported relative to the center shaft 34 by a bearing unit 62. The rim support roll 60 is a generally annular shaped ring having a threaded inner opening 64 and an outer surface 66, best shown in FIG. 5. The threaded inner opening 64 is adapted to mesh with threads provided on a ball screw 68 disposed about the center shaft 34. The outer surface 66 of the support roll 60 has a predetermined profile which is generally complimentary to that of the associated corresponding portion of the vehicle wheel which the support roll 60 supports, as will be discussed below.

Figure 6:
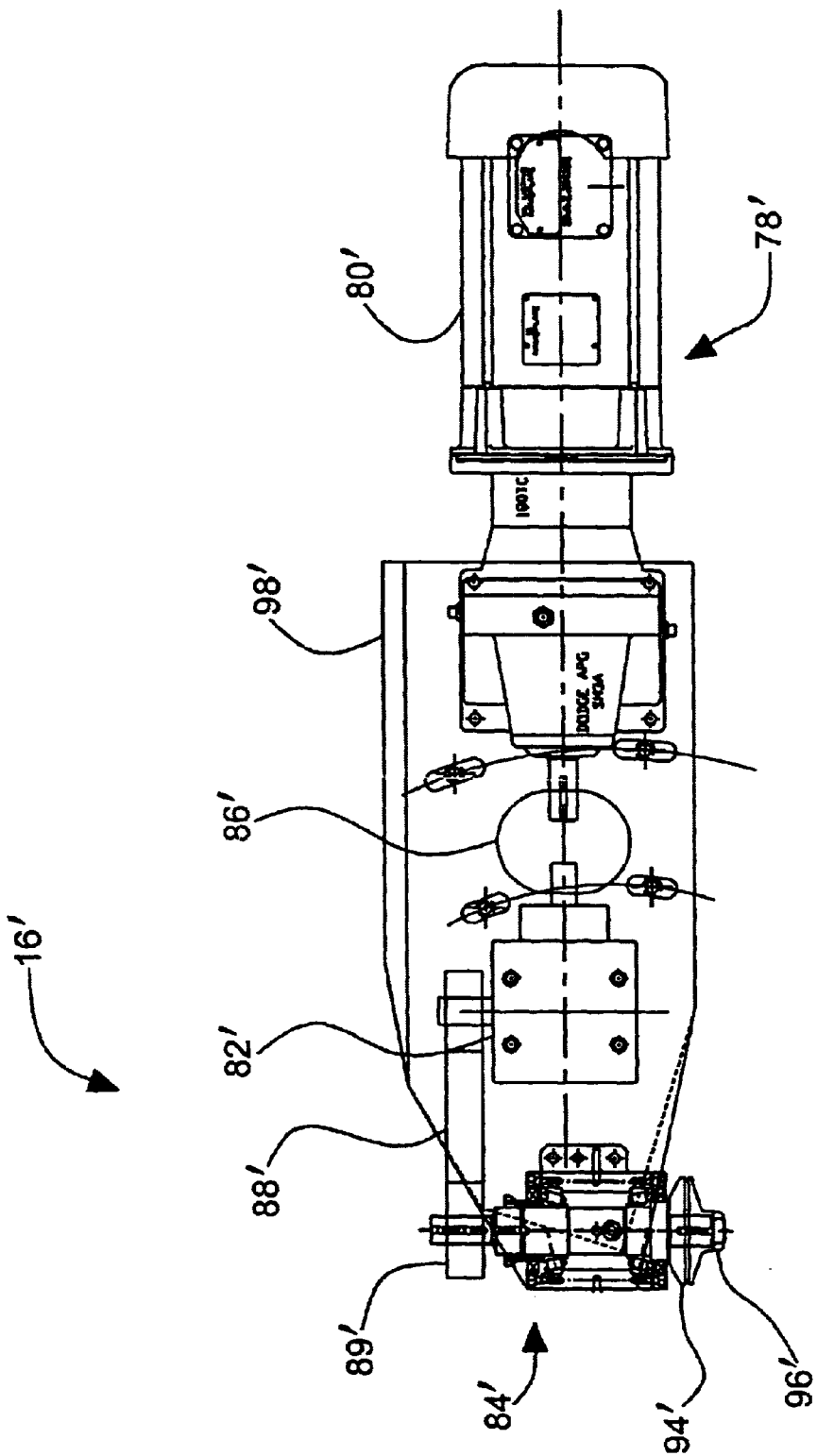
FIG. 6 is a view of the upper drive assembly shown in the apparatus of the present invention illustrated in FIG. 1.

As shown in FIG. 6, the upper drive assembly 16' includes an electric condition drive unit 78' having an electric motor and gear reducer 80', a gear box 82', and an upper tooling assembly 84'. The electric motor and gear reducer 80' is operatively connected to the gear box 82' via a coupling 86'. The gear box 82' is operatively connected to the upper tooling assembly 84' via a belt 88'. The upper drive unit 78' further includes a plate 98' having a plurality of openings (not shown) formed therein. As discussed above, threaded fasteners (not shown) extend through the openings and are received in the threaded openings 404A' provided in the adapter 404' of the servo drive unit 400' to operatively secure the drive unit 78' to the drive unit 400' for a purpose to be discussed below. Preferably, the motor and gear reducer 80' is normally in an actuated state so as to normally rotate a conditioner roll 100' of the upper tooling member 94' whenever the upper drive assembly 16' is actuated.

Figure 7:
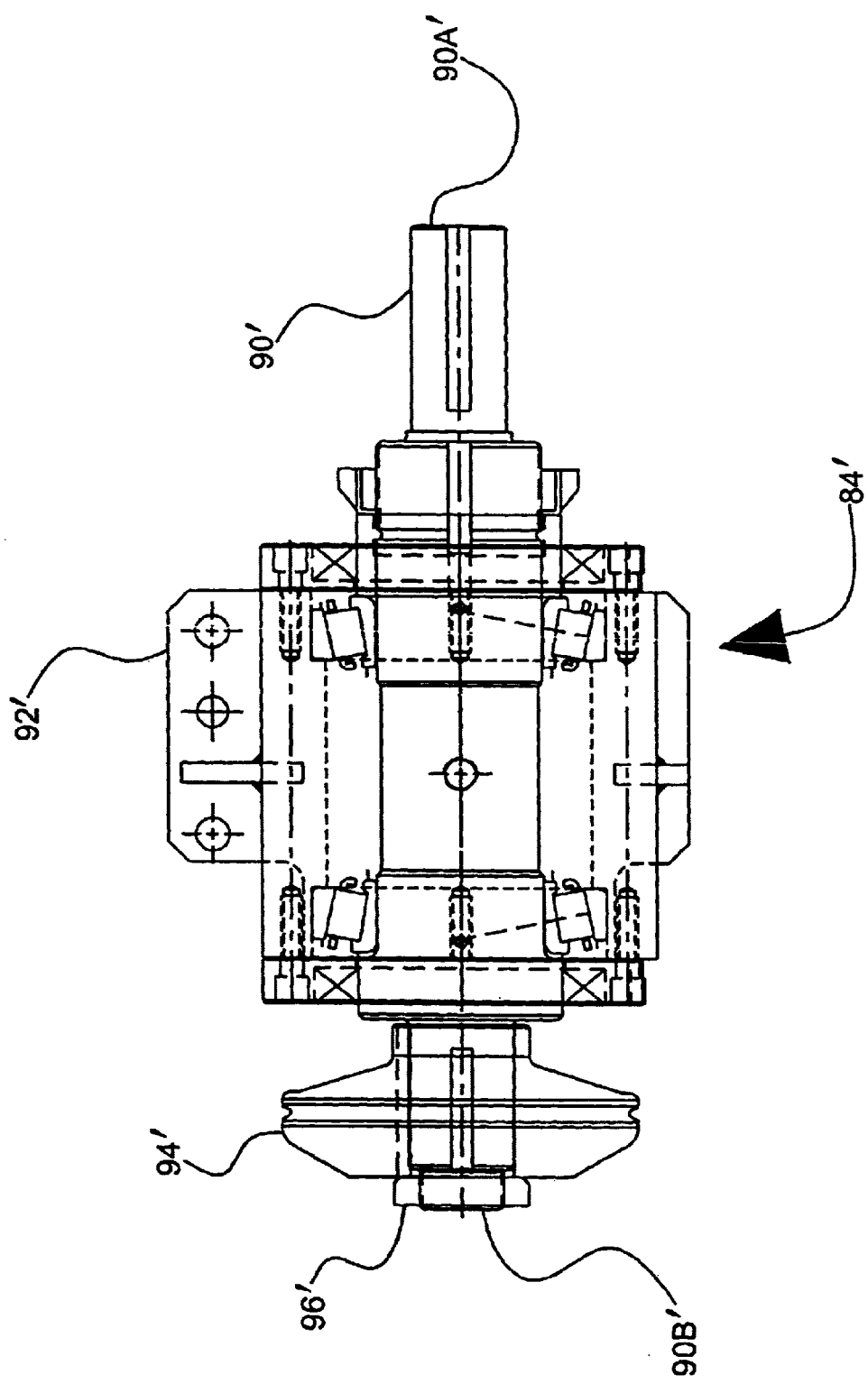
FIG. 7 is a view of the shaft assembly of the upper drive assembly shown in the apparatus of the present invention illustrated in FIGS. 1 and 6.

As best shown in FIG. 7, the upper tooling assembly 84' includes a shaft 90', a bearing unit 92' for rotatably supporting the shaft 90', and an upper tooling member 94' operatively connected to the shaft 90' for rotation therewith. The shaft 90' includes a first end 90A' and an opposite second end 90B'. The first end 90A' of the shaft 90' is operatively connected to the belt 88' by suitable means. In the illustrated embodiment, the first end 90A' is connected to the belt 88' by a gearbelt sprocket 89'.

The upper tooling member 94 is disposed on the opposite second end 90B of the shaft 90 for rotation therewith. A lock nut 96 is disposed on the second end 90B of the shaft 90 to removably secure the upper tooling member 94 on the second end 90B of the shaft 90.

Figure 8:
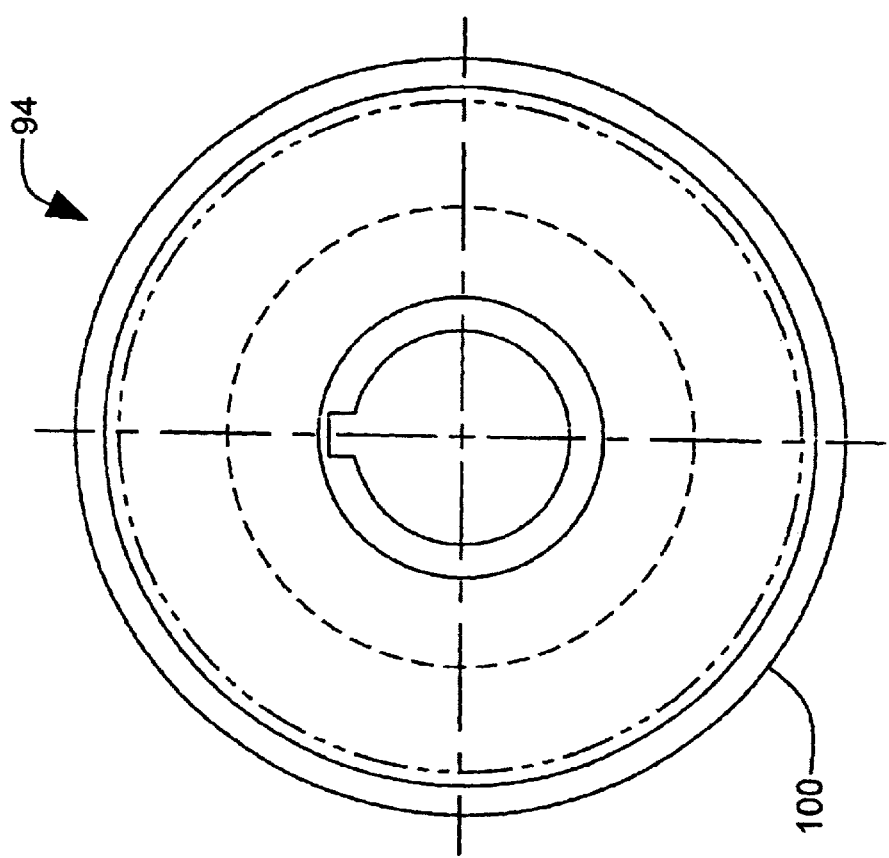
FIG. 8 is a view of the conditioner roll shown in the apparatus of the present invention illustrated in FIG. 1.
Figure 9:
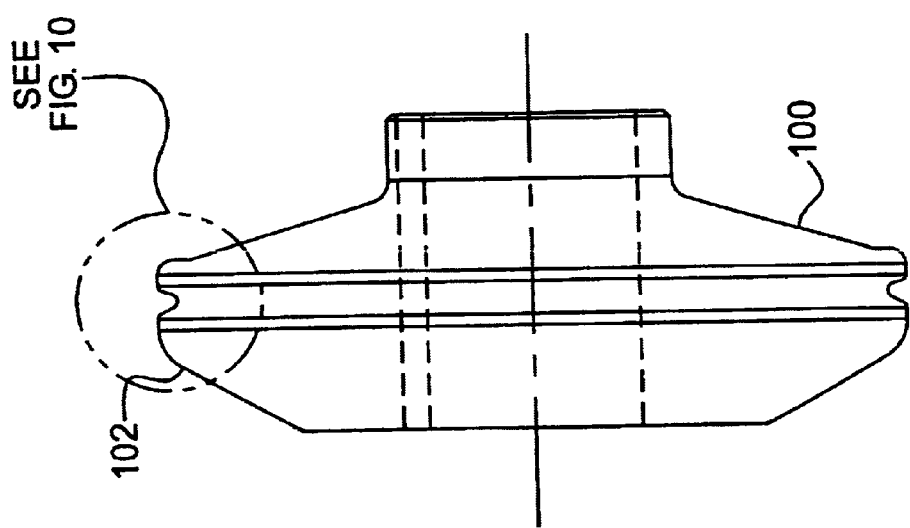
FIG. 9 is another view of the conditioner roll illustrated in FIGS. 1 and 8.
Figure 10:
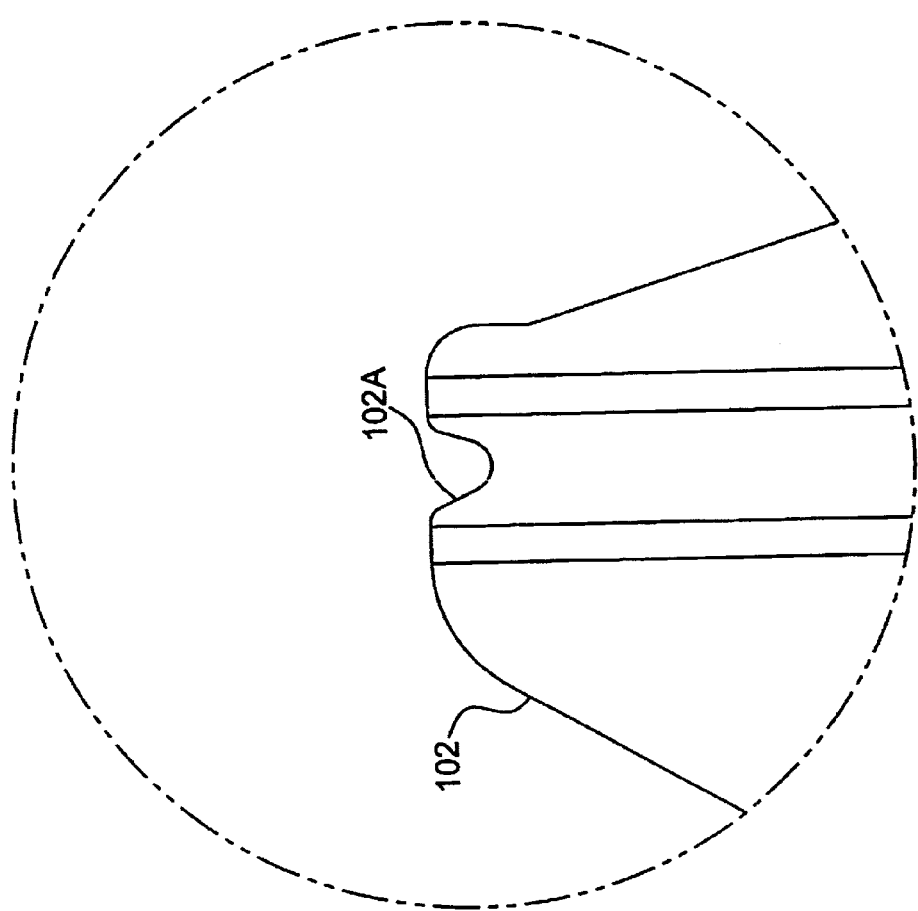
FIG. 10 is an enlarged view of a portion of the conditioner roll illustrated in FIG. 9.

As shown in FIGS. 8–10, the upper tooling member 94 includes a conditioner roll 100 which is rotatably supported on the shaft 90 by the bearing unit 92. The conditioner roll 100 is a generally annular shaped member and is keyed onto the second end 90B of the shaft 90. The conditioner roll 100 includes an outer surface 102 having predetermined profile. In particular, as best shown in FIG. 10, the outer surface 102 includes a conditioner groove 102A provided therein for a purpose to be discussed below.

Figure 11:
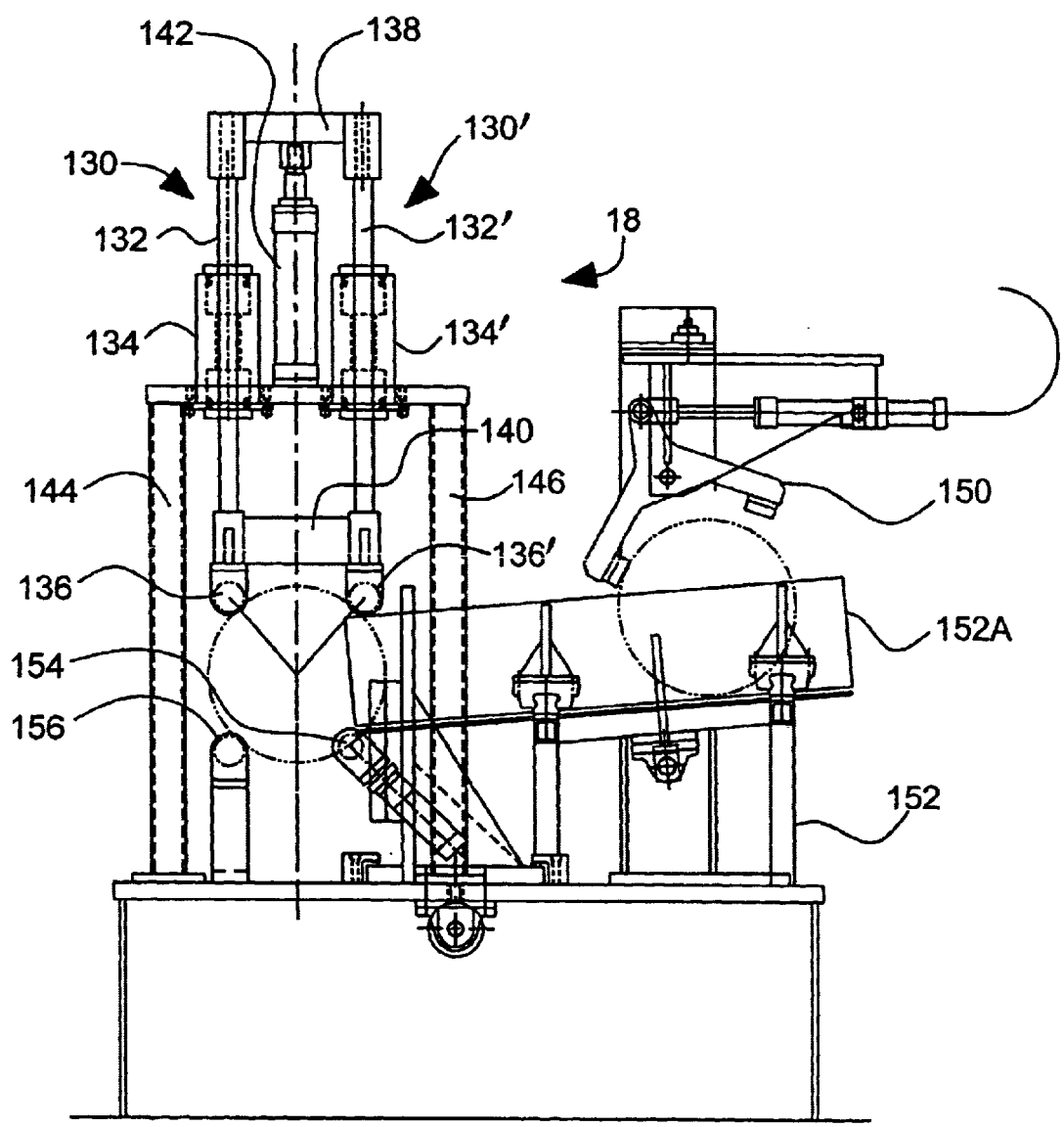
FIG. 11 is another view of the apparatus of the present invention illustrated in FIG. 1.

As shown in FIGS. 1 and 11, the upper rim guide assembly 18 includes a pair of front legs 144 and a pair of rear legs 146 (only one of such rear legs 146 is illustrated in FIG. 11). The legs 144 and 146 are connected at their respective lower ends to the main base assembly 12, and are connected at their respective upper ends to guide rod mounting plate 148.

The upper rim guide assembly 18 further includes a pair of rim guide assemblies 130 and 130'. Structurally, the rim guide assemblies 130 and 130' are essentially mirror images of one another. The rim guide assembly 130 includes a guide rod 132, a guide rod housing 134 and a roller 136. The rim guide assembly 130' includes a guide rod 132', a guide rod housing 134' and a roller 136'. The upper ends of the guide rods 132 and 132' are connected to yoke 138, and the lower ends of the guide rods 132 and 132' are connected to a roller housing 140. The roller housing 140 is operative to rotatably support the rollers 136 and 136' of the respective rim guide assemblies 130 and 130'. The upper rim guide assembly 18 further includes a pneumatically controlled cylinder 142 which is connected to the yoke 138 and is operative to selectively control the position of the rollers 136 and 136' via movement of the guide rods 132 and 132', respectively.

Referring now to FIG. 11, there is illustrated another view of the wheel edge conditioning apparatus 10 of the present invention which shows the loading and unloading of a vehicle wheel 198 (the vehicle wheel 198 being shown schematically in FIG. 11) to and from the apparatus 10 of the present invention. As shown therein, to accomplish this the apparatus 10 includes a kicker assembly 150, a chute assembly 152, an eject kicker assembly 154 and a stationary roll assembly 156. In operation, when the kicker assembly 150 is actuated, the vehicle wheel 198 moves from the right to the left in FIG. 11 down the chute assembly 152 until it contacts the stationary roll assembly 156. After the vehicle wheel 200 has been conditioned in accordance with the present invention, the upper rim guide cylinders 142 and 142' are actuated lifting the upper guide rollers 136 and 136', then the eject kicker assembly 154 is actuated causing the vehicle wheel 198 to be ejected to an exit chute 152A of the chute assembly 152.

Figure 12:
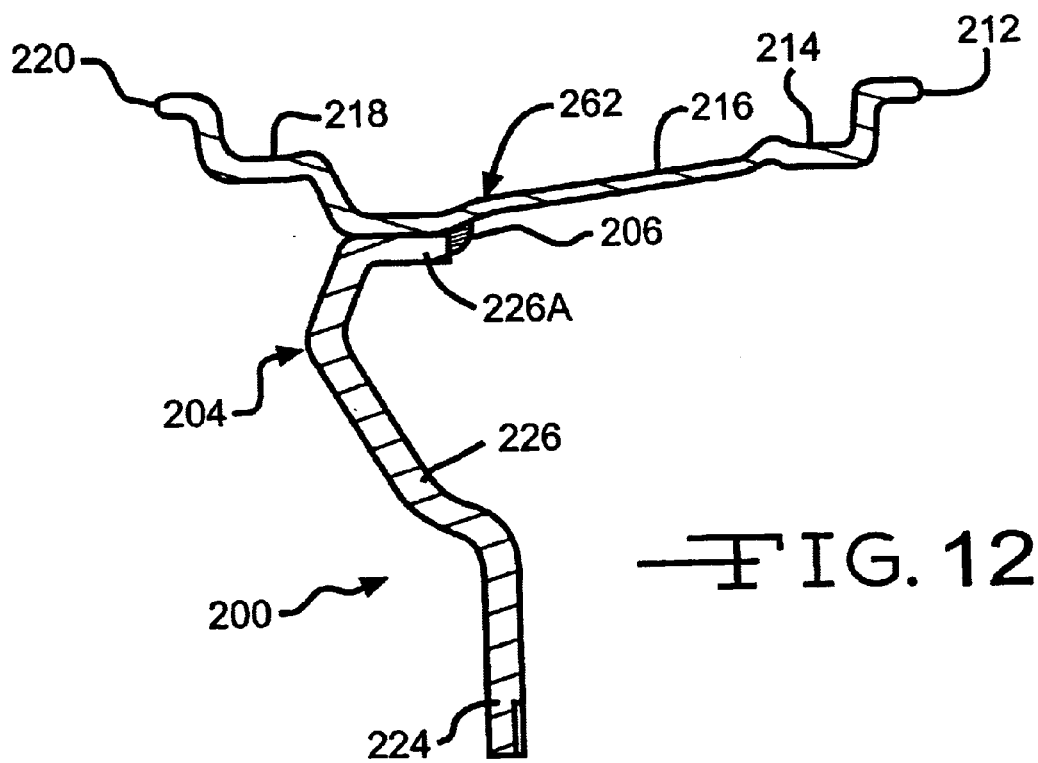
FIG. 12 is a partial sectional view of a first embodiment of a vehicle wheel constructed using the apparatus of the present invention.
Figure 20:
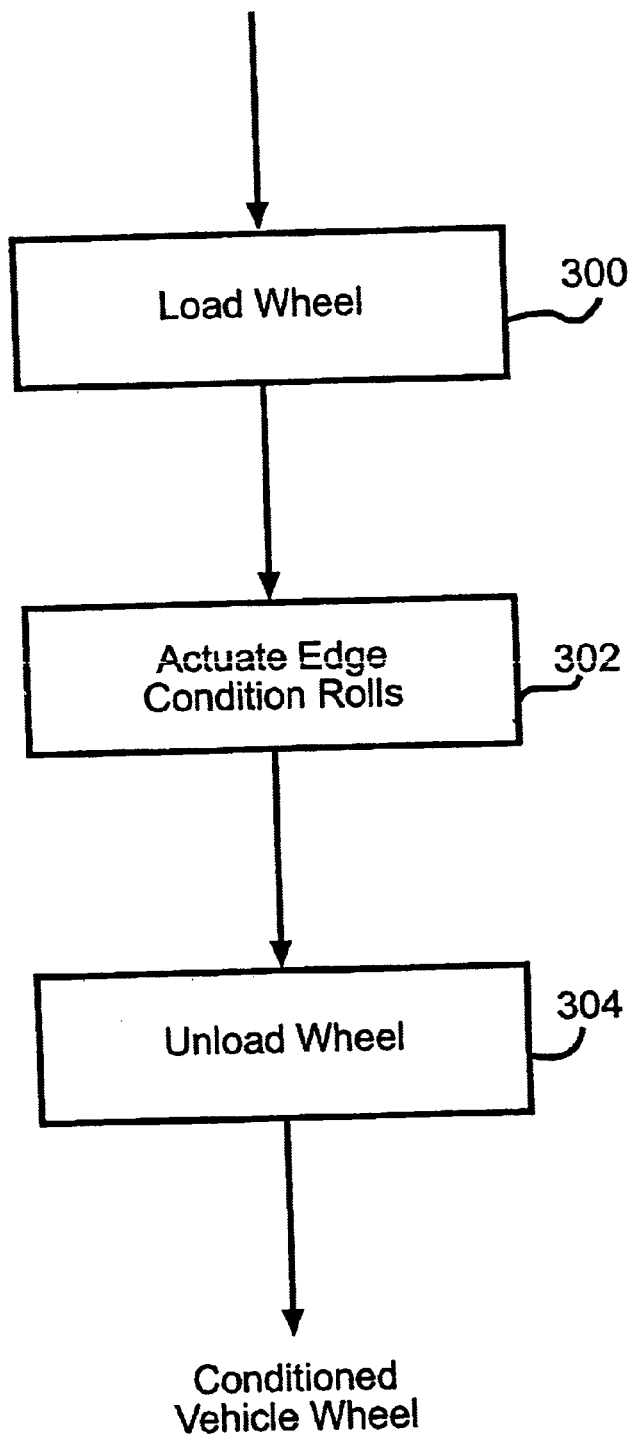
FIG. 20 is a block diagram showing a sequence of steps for producing a vehicle wheel in accordance with the apparatus of the present invention.

Turning now to FIG. 20, the operation of the present invention will now be discussed. Initially, a vehicle wheel is provided. The vehicle wheel is preferably a fabricated vehicle wheel 200, such as that shown in FIG. 12. As shown in FIG. 12, the vehicle wheel 200 is a fabricated well attached vehicle wheel and includes a wheel rim 202 and a wheel disc 204 joined together by a weld 206.

The wheel rim 202 is a fabricated rim formed from a suitable material, such as for example, steel, aluminum or alloys thereof, magnesium, or titanium. The wheel rim 202 includes an inboard tire bead seat retaining flange 212, an inboard tire bead seat 214, a generally axially extending well 216, an outboard tire bead seat 218, and an outboard tire bead seat retaining flange 220.

Figure 13:
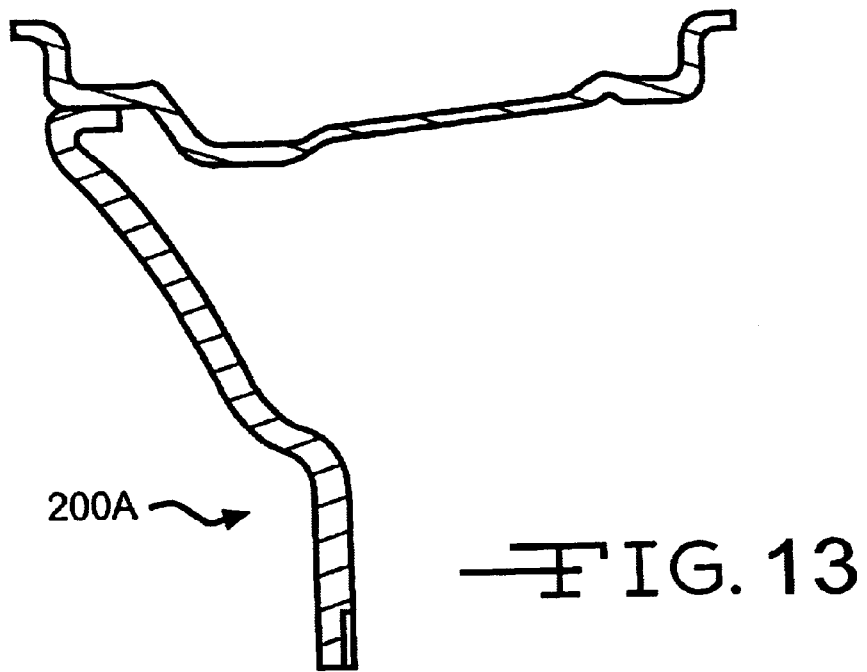
FIG. 13 is a partial sectional view of a second embodiment of a vehicle wheel constructed using the apparatus of the present invention.
Figure 14:
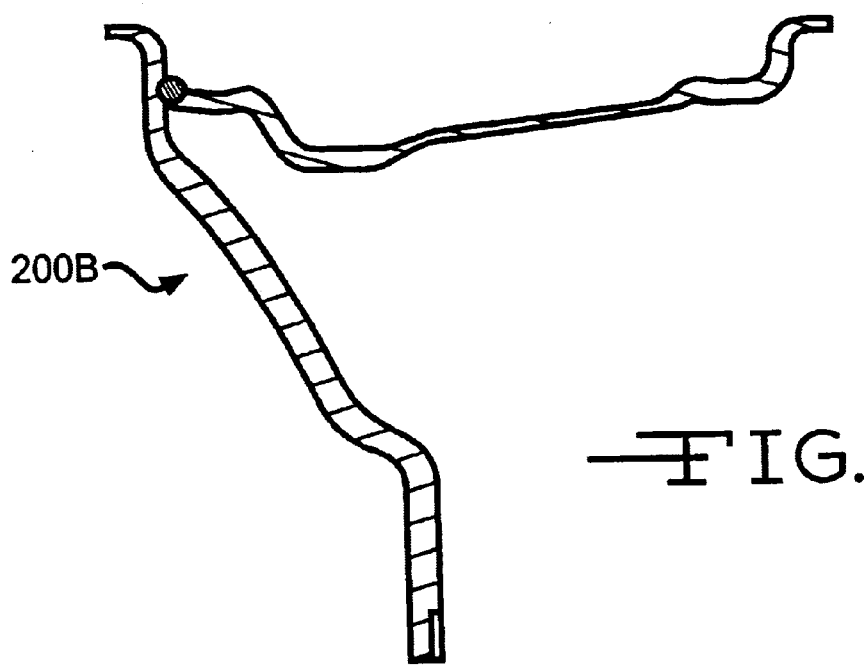
FIG. 14 is a partial sectional view of a third embodiment of a vehicle wheel constructed using the apparatus of the present invention.
Figure 15:
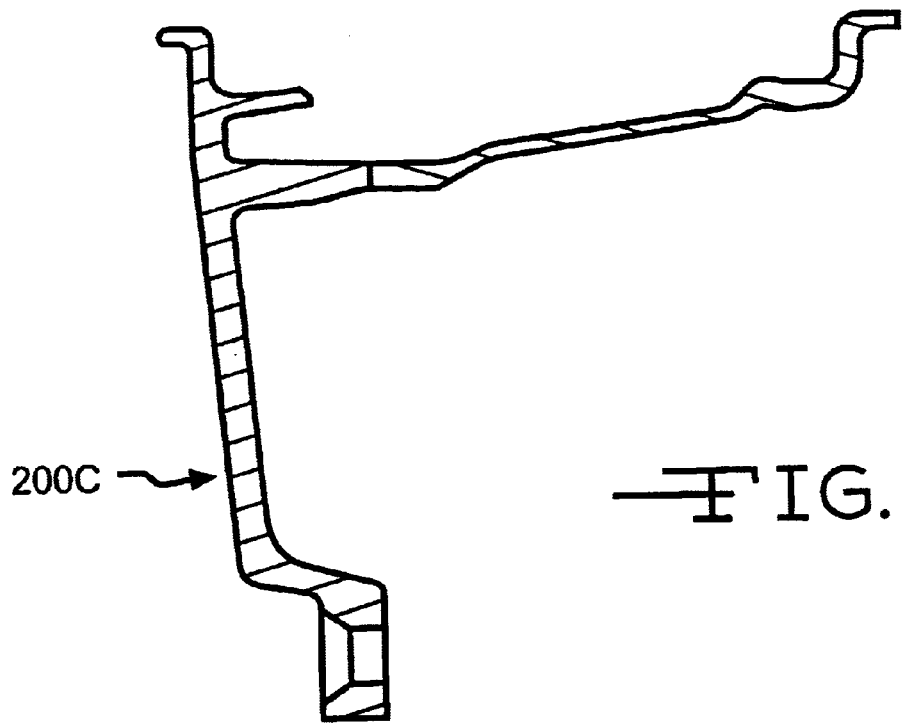
FIG. 15 is a partial sectional view of a fourth embodiment of a vehicle wheel constructed using the apparatus of the present invention.

The wheel disc 204 is forged, cast, fabricated, or otherwise formed from a suitable material, such as for example, steel, aluminum or alloys thereof, steel, magnesium, or titanium. The wheel disc 204 includes a generally centrally located wheel mounting surface 224 and an outer annular portion 226. The wheel mounting surface 224 is provided with a centrally located pilot aperture (not shown) and a plurality of lug bolt receiving holes (not shown) circumferentially spaced around the pilot aperture. The lug bolt receiving holes receive lug bolts (not shown) and nuts (not shown) for securing the vehicle wheel 200 to an associated component (not shown) of a vehicle. The outer annular portion 226 of the wheel disc 204 includes a flange 226A which is disposed adjacent a portion of the underside of the well 216 of the wheel rim 202 and receives the weld 206 to join the wheel rim 202 and the wheel disc 206 together. The wheel disc 204 may also include a plurality of decorative openings or windows (not shown). Alternatively, the construction of the vehicle wheel 200 can be other than illustrated if so desired. For example, as shown in FIG. 13, the vehicle wheel can be a fabricated bead seat attached vehicle wheel 200A; as shown in FIG. 14, the vehicle wheel can be a fabricated full face vehicle wheel 200B; and as shown in FIG. 15, the vehicle wheel can be a modular vehicle wheel 200C. In addition, while the present invention is preferably used on fabricated types of wheels, the invention can be used in connection with cast type of vehicle wheels if so desired.

The vehicle wheel 200 is first loaded onto the apparatus 10 of the present invention during step 300, as discussed above in connection with FIG. 11, so that the wheel 200 is in the far left hand position shown in FIG. 11 (in FIG. 11 the wheel is denoted by reference number 198). Next, during step 302, the upper rim guide assembly 18 is moved downwardly causing the rollers 136 and 136' to contact the adjacent wheel surface and trap the wheel between the rollers 136 and 136' of the upper rim guide assembly 18 and the lower tooling members 32 and 32' of the lower tooling assembly 14 (the lower tooling assembly 14 being preadjusted to accommodate the particular size, i.e., width, of the vehicle wheel). Preferably, at about the same time, the two upper electric servo drive units 400 and 400' are actuated so as to move the respective condition units 78 and 78', and therefore the rolls 94 and 94', down near the associated adjacent surfaces of the wheel. When it has been determined that the vehicle wheel 300 is in the correct position by setup and first piece approval, the servo drive units 400 and 400' are operative to further move the condition units 78 and 78' so that the rolls 94 and 94' come into contact with the rim flanges 212 and 220. In the illustrated embodiment, the left hand condition roll 94 engages the inboard rim flange 212 and the right hand condition roll 94' engages the outboard rim flange 220 to condition the respective flanges 212 and 220 of the vehicle wheel 300. Following this, in step 304, the conditioned vehicle wheel 300 is unloaded from the apparatus 10 by the lifting of the upper guide rollers 136 and 136' and the eject kicker assembly 154 being actuated as described above.

Figure 16:
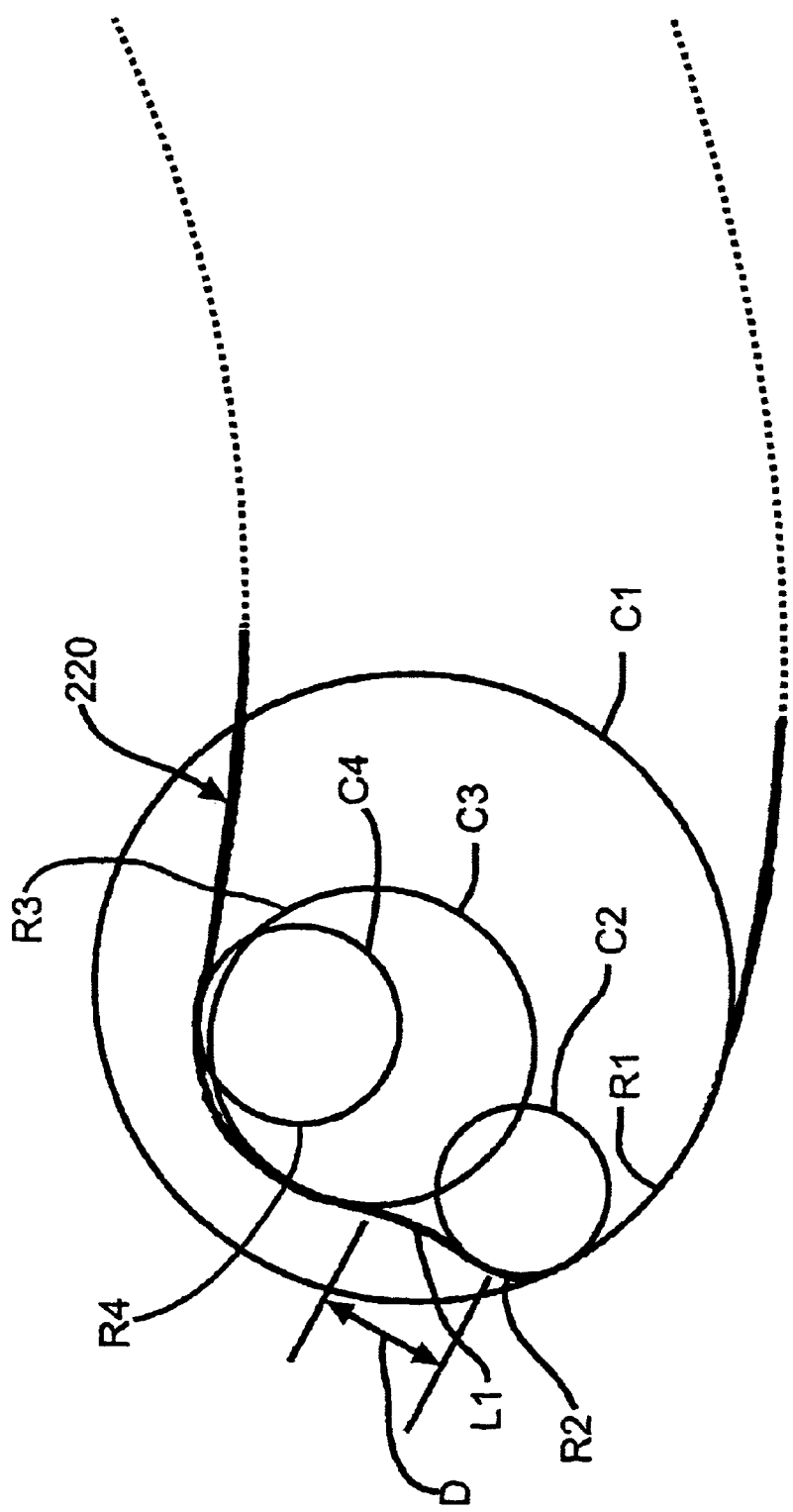
FIG. 16 is an enlarged view of an outboard flange portion of the vehicle wheel illustrated in FIG. 12.
Figure 17:
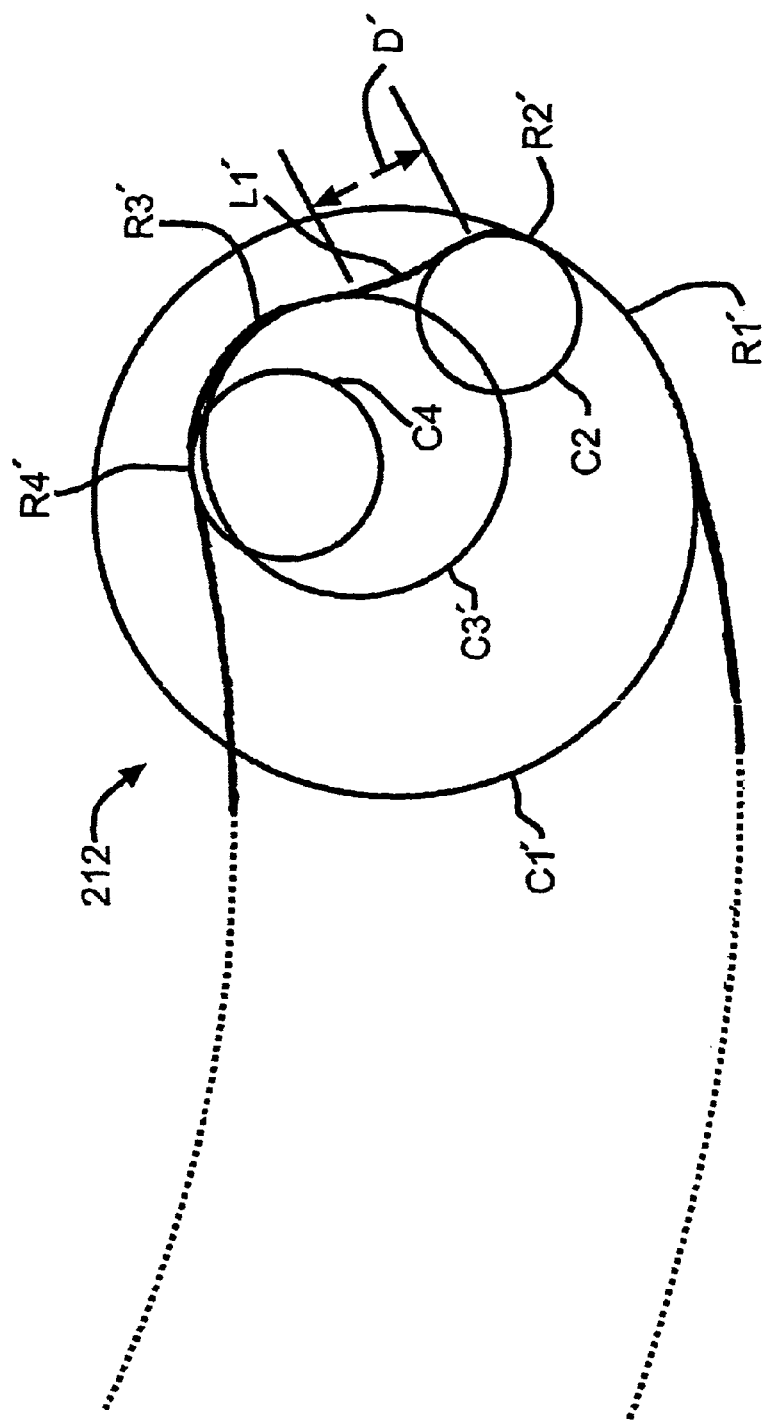
FIG. 17 is an enlarged view of an inboard flange portion of the vehicle wheel illustrated in FIG. 12.
Figure 18:
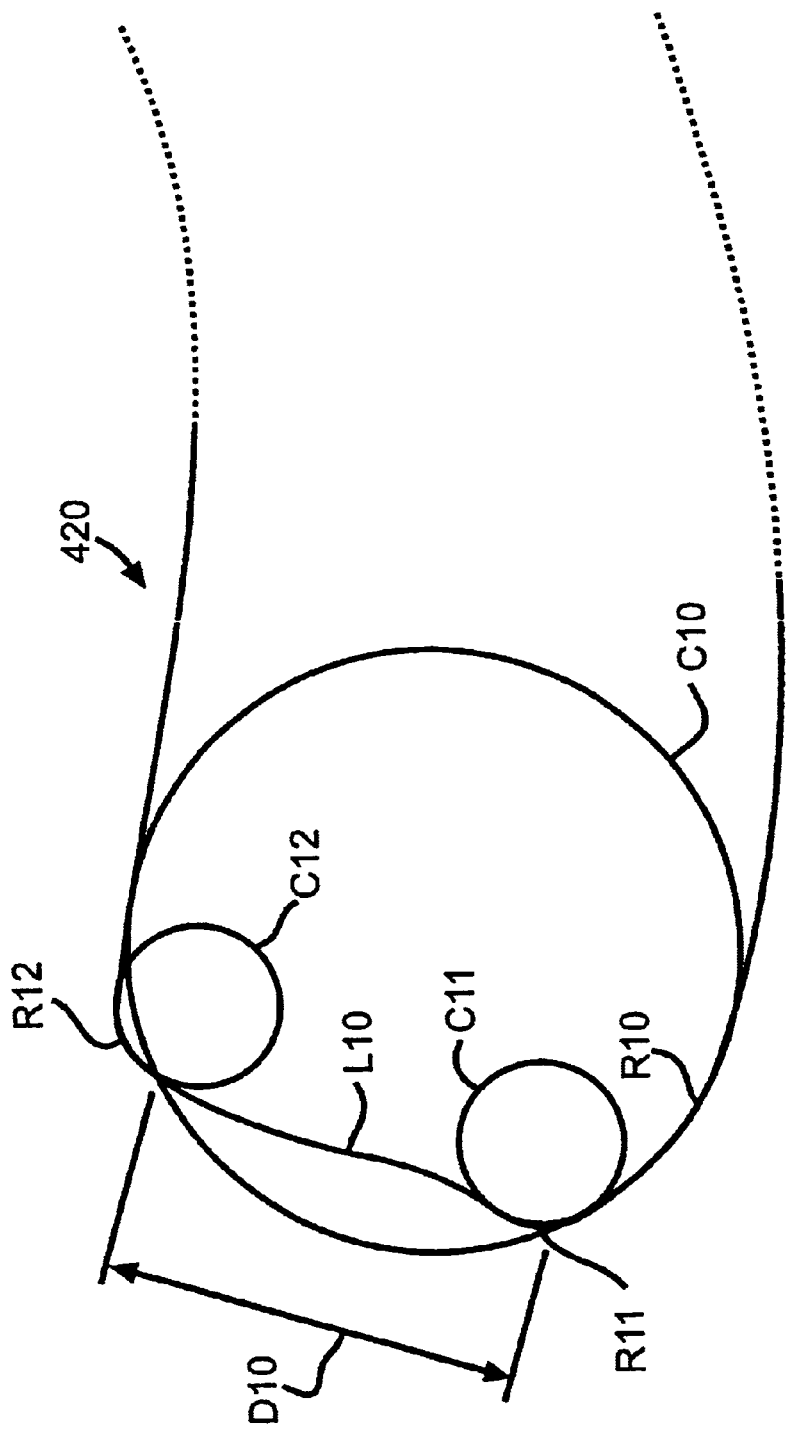
FIG. 18 is an enlarged view of an outboard flange portion of a prior art vehicle wheel.
Figure 19:
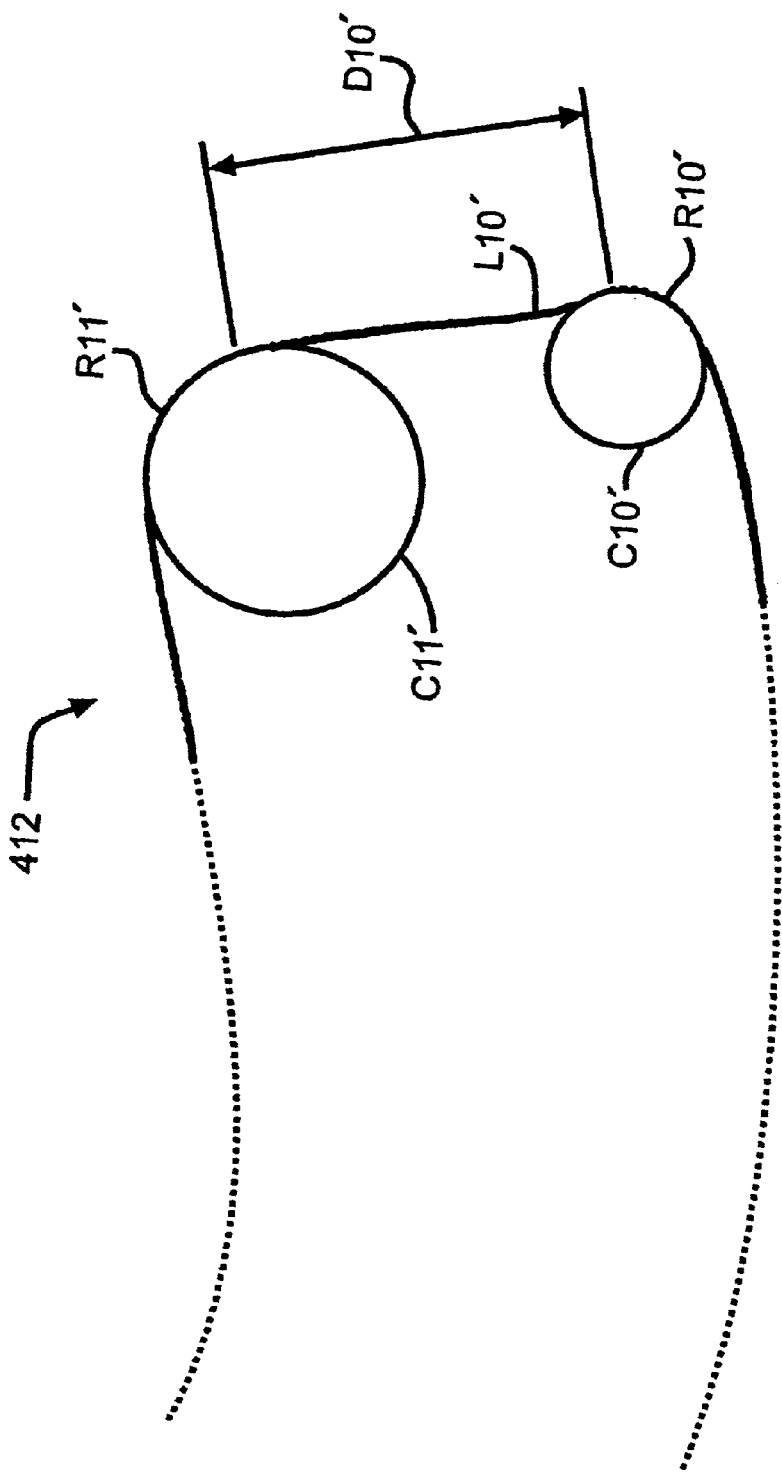
FIG. 19 is an enlarged view of an inboard flange portion of the prior art vehicle wheel.

One advantage of the present invention is that the apparatus 10 is operative to provide the flanges of the vehicle wheel with a conditioned edge. This is illustrated in comparing the conditioned flanges of the present invention shown in FIGS. 16 and 17 to the flanges of a prior art non-conditioned vehicle wheel shown in FIGS. 18 and 19. As shown in FIG. 16, the outboard flange 220 of the vehicle 200 of the present invention is defined by five portions, four of the portions being generally radius portions R1–R4 defined by for respective circles C1–C4, and one portion being a generally straight line L1 which extends a distance D. Similarly, the inboard flange 212 of the vehicle wheel 200 of the present invention is defined by five portions, four of the portions being generally radius portions R1'–R4' defined by for respective circles C1'–C4', and one portion being a generally straight line L1' which extends a distance D'. As shown in prior art FIG. 18, the non-conditioned outboard flange 420 of the prior art vehicle wheel is defined by four portions, three of the portions being generally radius portions R10–R13 defined by for respective circles C10–C13, and one portion being a generally straight line L10 which extends a distance D10. Similarly, as shown in prior art FIG. 19, the non-conditioned inboard flange 412 of the prior art vehicle wheel is defined by three portions, two of the portions being generally radius portions R10'–R11' defined by for respective circles C10'–C11', and one portion being a generally straight line L10' which extends a distance D10'. From these drawings, it can be seen that the flanges 212 and 220 of the present invention are generally more curved or rounded compared to the prior flanges 412 and 420. In particular, it can be seen that the distances D and D' of the respective straight line portions L1 and L1' of the flanges 212 and 220 of the vehicle wheel 200 of the present invention are much smaller than the distances D10 and D10' of the respective straight line portions L10 and L10' of the flanges 412 and 420 of the prior art vehicle wheel. Another advantage of the present invention is that the electric servo units 400 and 400' of the present invention are operative to give precise control, enable varying speeds, and provide for repeatability and will operate with variance related to the incoming parts (i.e., varied widths and thicknesses).

In accordance with the provisions of the patent statutes, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. An apparatus for conditioning the outer flanges of a vehicle wheel comprising:
    a main base assembly secured to a fixed surface, an adjustable lower tool assembly operatively supported by the main base assembly and adjustable to accommodate different wheel widths, a pair of upper drive assemblies operatively supported by the main base assembly, and an upper rim guide assembly, wherein each of the upper drive assemblies includes an electric servo drive unit operatively connected to drive a conditioner roll having an outer surface provided with a predetermined profile to engage and condition at least one of the outer flanges of the vehicle wheel;
    wherein the lower tool assembly includes a pair of rim support rolls having a predetermined profile which is generally complimentary to that of the associated corresponding portion of the vehicle wheel which the rim support rolls support.

2. The apparatus according to claim 1 wherein the conditioner rolls are rotatably supported on a shaft by a bearing unit.

3. The apparatus according to claim 1 wherein the main base assembly includes a pair of motor stands for supporting the pair of upper drive assemblies.

4. The apparatus according to claim 3 wherein the main base assembly further includes a ball screw mechanism operatively coupled to the motor stands, the ball screw mechanism operative to adjust the position of the motor stands relative to a center axis of the main base assembly.

5. The apparatus according to claim 1 wherein the upper rim guide assembly includes a roller selectively moveable between a first position, wherein the roller is spaced from contact with an associated surface of the vehicle wheel, and a second position, wherein the roller is in contact with the associated surface of the vehicle wheel.

6. The apparatus according to claim 1 wherein the apparatus further includes a load and unload assembly.

7. A method for producing a vehicle wheel having at least one conditioned outer flange comprising the steps of:
    providing a vehicle wheel having a pair of outer flanges;
    loading the vehicle wheel into an apparatus for conditioning the outer flanges of the wheel, the apparatus including an electric servo drive unit operatively connected to drive a conditioner roll having an outer surface provided with a predetermined profile adapted to engage and condition the outer flanges of the vehicle wheel and an adjustable lower tool assembly adjustable to accommodate different wheel widths and having a pair of rim support rolls having a predetermined profile which is generally complimentary to that of the associated corresponding portion of the vehicle wheel which the rim support rolls support;
    actuating the electric servo motor unit of the apparatus whereby the conditioner roll conditions at least one of the flanges of the vehicle wheel; and
    unloading the conditioned vehicle wheel from the apparatus.

8. A fabricated vehicle wheel produced according to the method of claim 7.

9. An apparatus for conditioning at least one outer flange of a vehicle wheel comprising:
    a main base assembly secured to a fixed surface, a lower tool assembly operatively supported by the main base assembly, a pair of upper drive assemblies operatively supported by the main base assembly, an upper rim guide assembly, and a load and unload assembly, wherein each of the upper drive assemblies includes an electric servo drive unit operatively connected to drive a conditioner roll having an outer surface provided with a predetermined profile to engage and condition at least one of the outer flanges of the vehicle wheel;
    wherein the lower tool assembly is adjustable to accommodate different wheel widths and includes a pair of rim support rolls having a predetermined profile which is generally complimentary to that of the associated corresponding portion of the vehicle wheel which the rim support rolls support, and the main base assembly includes a pair of motor stands for supporting the pair of upper drive assemblies.

10. The apparatus according to claim 9 wherein the conditioner rolls are rotatably supported on a shaft by a bearing unit.

11. The apparatus according to claim 9 wherein the upper rim guide assembly includes a roller selectively moveable between a first position, wherein the roller is spaced from contact with an associated surface of the vehicle wheel, and a second position, wherein the roller is in contact with the associated surface of the vehicle wheel.

12. The apparatus according to claim 9 wherein the main base assembly further includes a ball screw mechanism operatively coupled to each of the motor stands, the ball screw mechanism operative to adjust the position of the motor stands relative to a center axis of the main base assembly.

13. The apparatus according to claim 9 wherein the upper rim guide assembly includes a roller selectively moveable between a first position, wherein the roller is spaced from contact with an associated surface of the vehicle wheel, and a second position, wherein the roller is in contact with the associated surface of the vehicle wheel.

* * * * *